Sept. 6, 1955        A. L. LADO        2,716,899
PIVOTAL GEARING

Filed Oct. 24, 1952        2 Sheets-Sheet 1

INVENTOR.
ANTHONY L. LADO
BY
ATTORNEY

Sept. 6, 1955         A. L. LADO            2,716,899
                     PIVOTAL GEARING Filed Oct. 24, 1952                    2 Sheets-Sheet 2

INVENTOR.
ANTHONY L. LADO
BY
          ATTORNEY ated Sept. 6, 1955

United States Patent Office 2,716,899

2,716,899

PIVOTAL GEARING

Anthony L. Lado, Rome, N. Y., assignor to Pettibone New York Corporation, Rome, N. Y., a corporation of New York Application October 24, 1952, Serial No. 316,712

7 Claims. (Cl. 74—385)

This invention relates to drive mechanisms, more particularly to drives for the dirigible wheels of vehicles that are turned in guiding or maneuvering the vehicles.

One of the objects of the present invention is to provide a steerable vehicle wheel drive which has a large angle of movement to permit turning of the vehicle on a short radius.

Another object is to provide a drive for a turnable steering wheel which maintains a constant angular drive relationship and turning rate between the main drive shaft and the wheel in all positions of the wheel.

Another object is to provide a dirigible drive particularly suited to use in heavy vehicles. More specifically, it is sought to provide a full or semi-floating drive for a vehicle wheel in which the wheel is rotatably mounted on a swingable housing and is driven by a shaft separately journaled in the housing.

Another object is to provide a combined dirigible wheel mounting and drive in which drive and driven components are carried or journaled in separate housings, the housings being pivoted together, and a driving connection is established between the driving and driven components through an intermediate element mounted for rotation about the pivot axis of the housings. This aspect of the invention is more specifically concerned with an arrangement in which the relatively swingable housings are formed with bracket extensions or ears received on common pivot means carrying a gear in constant mesh with a drive gear carried by shaft means in a so-called fixed housing and with a driven gear carried by shaft means in a so-called swingable housing.

A further object is to provide a two-housing drive of the character mentioned, in which the pivot means, the housing brackets received on the pivot means and the intermediate drive element or gear are surrounded by and enclosed within a flexible member making sealing connection with each of the housings to protect the pivot joints and the intermediate drive against dirt and other foreign particles.

A still further object is to provide a drive for a turnable vehicle wheel which is of relatively simple design and construction and can be easily and economically manufactured in quantity and is readily serviced and repaired.

Other objects and advantages pertaining to certain features of construction and novel combinations and arrangements of parts will become apparent in the following detailed description made in connection with the accompanying drawings forming a part of the specification.

In the drawings:

Figure 1 is a perspective view, diagrammatic in character, partly in section and with parts broken away and removed, illustrating the present invention as embodied in a drive mechanism for one of the steerable wheels of a road grader or the like;

Figure 1:
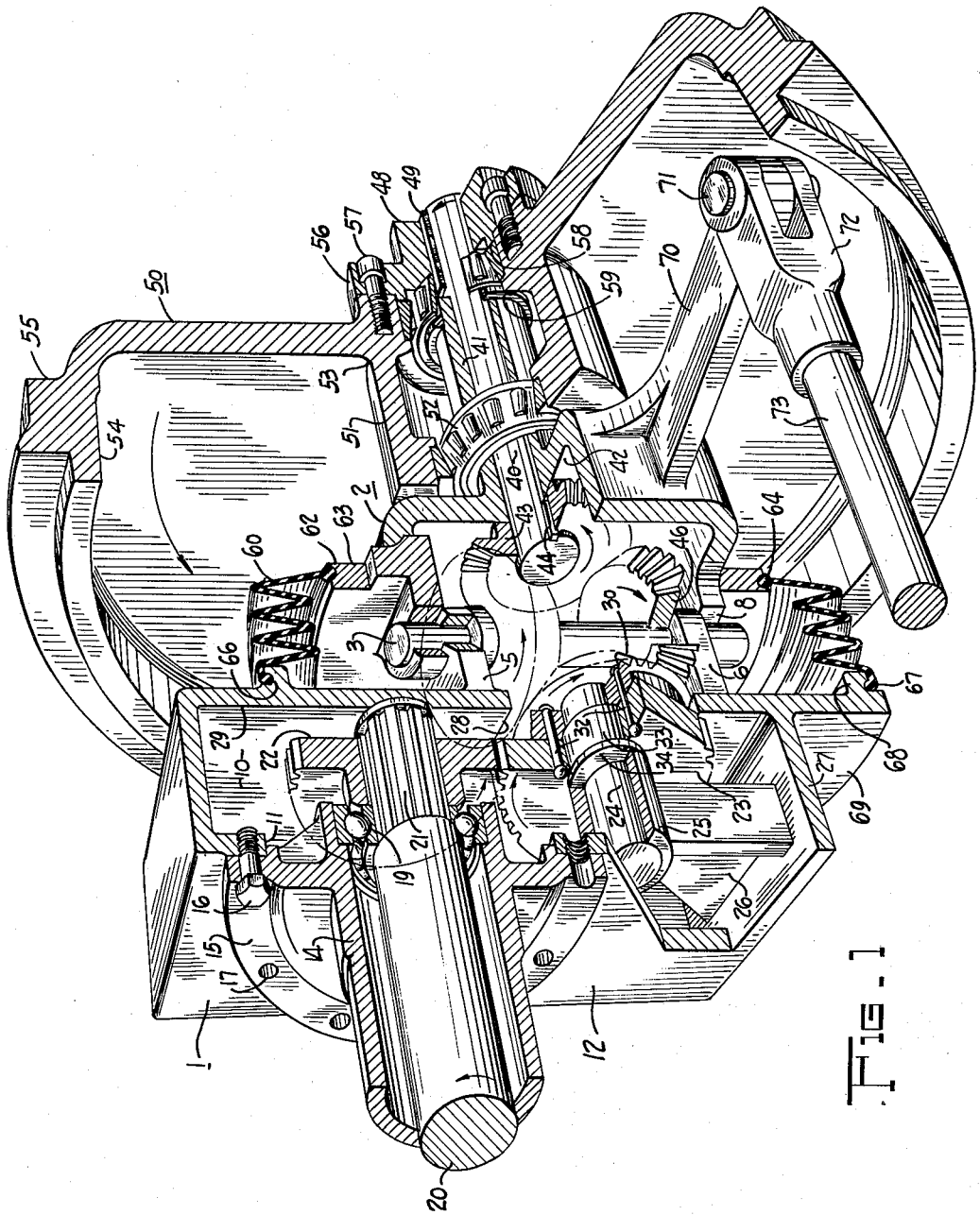
Figure 2:
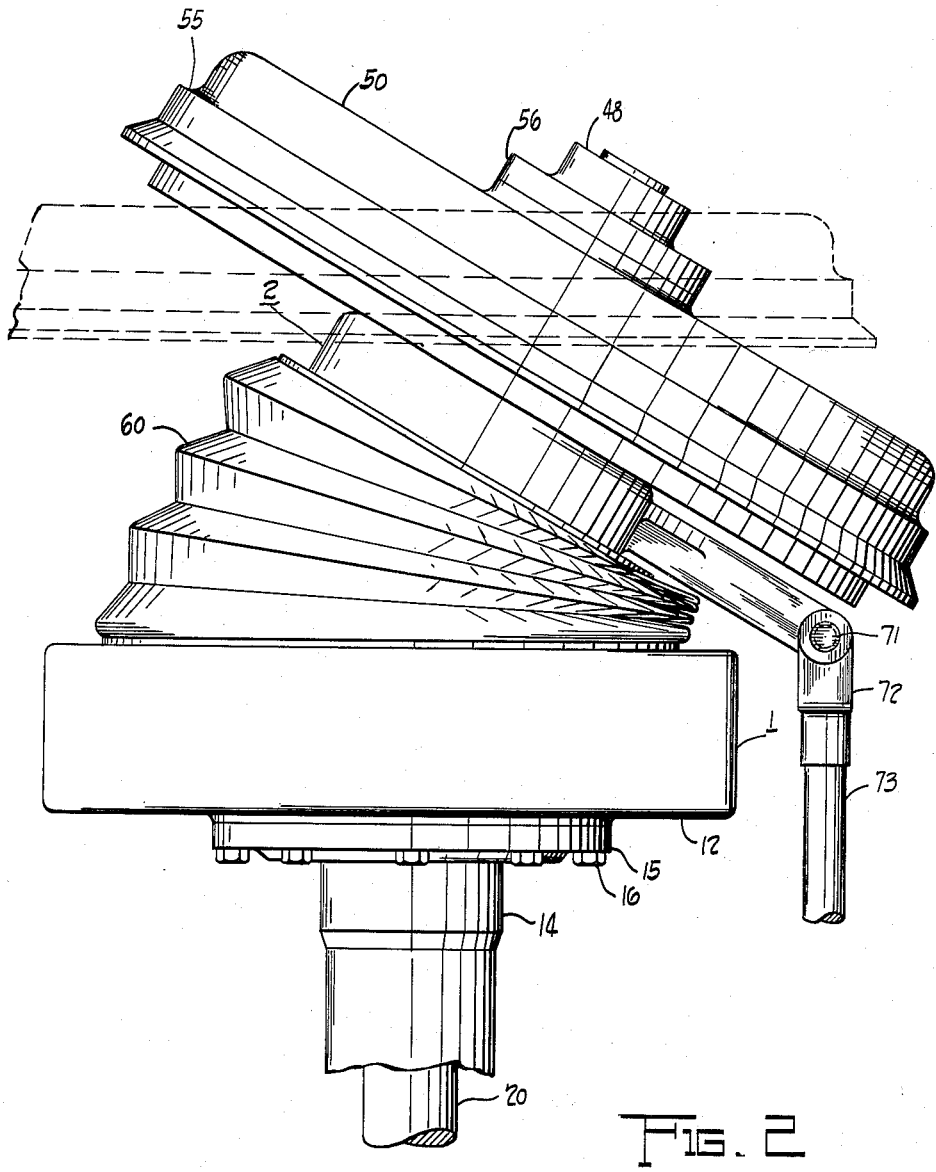
Fig. 2 is a plan view of the mechanism of Fig. 1, partly in section and with parts broken away and removed, showing, in full lines, the driven member with its axis of rotation oblique to the rotational axis of the drive member and, in broken lines, the driven member with its rotational axis parallel to the rotational axis of the drive member.

The figures illustrate the adaptation of the principles of the present invention to the drive for one of the steerable wheels of a heavy duty vehicle, say a road grader, such vehicle being required to operate under extreme dust conditions and the wheels and suspension system being required to withstand severe stresses in all directions. The frame, chassis, engine and controls of the grader are conventional and have been omitted from the drawings, it being understood that the illustrated drive mechanism is used in replacement of a conventional drive.

The drive comprises a pair of hinged together frame members which may take the form of housings 1 and 2 that are connected together for relative swinging or turning by a rod 3. The housing 1 is fixed to the vehicle frame (not shown) as by bolts or welding, the orientation being such that the rod or shaft 3 establishes a swing axis for the housing member 2 that is vertical or substantially so. The confronting faces of the housing are formed with recesses or gear receiving pockets, the housings each including a pair of integral vertically spaced ears that are apertured at their ends to receive the pivot shaft 3. Ears 5 and 6 on the housing 1 are received or confined between ears 7 and 8 on the housing 2 to hold the frame members or housings against relative axial movement along the pivot shaft. Suitable bushings or bearings (not shown) may be incorporated in the ears to withstand the loads imposed on the swing joint and to reduce the friction in the joint. A pin (not shown) through the rod 3 and one of the ears locates and holds the pin in the joint.

The housing 1, which may comprise a steel casting, includes walls defining a gear chamber 10. A circular opening 11 in vertical or upright inner wall 12 of the housing receives one end of a tubular casing or shroud 14 formed with an integral radially directed circular flange 15 that constitutes a closure for the housing opening 11. Cap screws 16 extend through circumferentially spaced openings 17 in the flange 15 and are screwed into threaded sockets in the housing wall 12 to retain and secure the latter in fixed relation to the shroud or casing 14. Journaled to turn in the shroud or casing as by ball bearing assembly 19 is main drive member of shaft 20, it being understood that this shaft and the tubular shroud or casing 14 surrounding the same extend to a suitable transmission assembly, from which power is derived conventionally.

Within the chamber 10 of the housing splined end 21 of the main drive shaft 20 receives a gear 22 which is thus driven by the shaft in unison. The gear is in constant mesh with a reversing gear 23 secured on and carried by the inner end of stub shaft 24. This stub shaft is journaled as by suitable bushings or bearings (not shown) in circular boss 25 on pedestal 26 cast integrally with the housing 1 and extending upwardly from bottom wall 27 of the latter.

The stub shaft 24 projects through a relatively large, circular opening 28 in wall 29 of the housing 1, the latter wall generally paralleling the wall 12 in spaced relation and constituting one of the walls of the gear chamber 10. The projecting outer end of the stub shaft 24 receives a bevel gear 30 which is disposed in a pocket or recess on the outside of the wall 29 of the housing or frame member 1, this gear recess being located between the brackets or ears 5 and 6 which carry the pivot rod or pin 3. The bevel gear 30 and the gear 23 are suitably secured together, as by pins 32, to turn in unison, thus constituting a pair of married gears. Desirably the stub shaft 24 includes a large diameter portion 33 on which the gear 23 is received, thereby providing a radial shoulder for locating the bevel gear 30 and for resisting end thrust on the latter. A thrust bearing in the form of a washer 34 is interposed between the large diameter portion 33 of the stub shaft and the tubular supporting boss 25. The gears 23 and 30 may, of course, be separately secured on spaced portions of the stub shaft and may be disposed on opposite sides of and separated by the wall 29.

The driven components of the assembly are carried by the swingable frame member or housing 2 and include a shaft 40 received through a wheel mount that takes the form of an integral tubular extension 41 of the housing. The inner end of the shaft 40 extends into recesss or pocket 42 formed in the inner face of the housing 2, opposite or in confronting relation to the recess in the housing 1 that receives the gear 30. A bevel gear 43 is secured against turning as by key 44 on the projecting inner end of the shaft 40, the gear being thus disposed in the pocket or recess 42 between the ears 7 and 8 that retain the movable housing on the pivot pin 3.

A bevel gear 46, free to turn on the pivot pin 3, constantly is in mesh with both the bevel gear 30 of the driving components and the bevel gear 43 of the driven components, the gear 46 thus constituting an intermediate driving means or element which by reason of the concentricity of its periphery to the swing axis of the movable housing 2 maintains a positive driving connection between the driving components carried by the relatively fixed housing 1 and the driven components carried by the swingable housing 2 in all angular positions of the latter.

Mounted on the housing extension 41 is a brake drum and a wheel hub assembly 50 that includes a central tubular portion 51 surrounding the tubular housing extension 41. The tubular hub is carried by the tubular housing extension in either semi-floating or full floating relation, the latter type of mounting being preferred and comprising axially spaced roller bearing assemblies 52 and 53.

The outer portion of the wheel hub 50 is formed with an inwardly directed cylindrical brake surface 54 and a wheel rim mounting surface 55. The brake components and wheel rim components, together with their attaching means, have been omitted to avoid confusion, it being understood that they are conventional and that the particular configuration and arrangement of the wheel hub 50 can be varied or modified to suit the requirements of the particular vehicle on which the drive is used.

The driven shaft 40 projects beyond the outer end of the tubular housing extension 41 and receives a flanged driving element 48 suitably secured as by key 49 against relative turning on the shaft.

Flange 56 of the driving hub 48 is received against the outer circular end face of the hub assembly 50, being secured to the latter by cap screws 57, which are recessed in the flange 56. An axially directed circular pilot flange 58 on the driving element 48 is received within a circular end opening or counterbore in the tubular portion 51 of the wheel hub 50 and bears against the outer race of the bearing assembly 53 to retain the bearing race against the shoulder at the bottom of the counterbore. Suitable means such as a collar 59 locates the inner race of the bearing assembly on the tubular extension 41 of the swingable housing 2, the collar being received in a circular rabbet milled in the outer surface of the housing extension 41. In this "full floating" mounting of the wheel hub 50 on the integral tubular extension 41 of the swingable housing the weight of the vehicle is carried wholly by the rigid parts of the swingable housing, the driven shaft 40 being utilized solely to transfer the driving torque to the wheel and to locate the wheel axially on the housing tube 41.

The swing joint of the drive assembly is enclosed in a flexible seal comprising an annular bellows 60 of rubber, leather or other suitable material. This bellows is of circular shape, or substantially so, and surrounds the pivot rod 3, the housing ears 5—8 and the gear means on the pivot rod, the bellows being disposed in the space between the confronting faces of the two housings. Circular beads are formed on the ends of the bellows, one bead 62 being received in a circular groove 64 formed about the periphery of a radially outwardly directed flange 63 on the swing housing 2. Bead 66 on the other end of the bellows is received in a groove 67 formed in an axially directed circular flange 68 on the main or fixed housing 1 and on a depending wall portion 69 of the latter.

Control of the swingable housing 2 is effected by an integral lever or arm 70 which extends laterally from the housing, the outer end of such lever receiving a pin 71 carried in clevis 72 on the end of a rod 73 forming part of a conventional steering system. The arm 70 and related steering mechanism hold the swingable housing 2 against turning on the pivot rod 3 and thus resist the torque reaction transmitted between the housings by gear means 46 on the pivot rod 3.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. A drive comprising a pair of housings, pivot means mounting one housing on the other for relative swinging movement, a drive transmitting element and means mounting such element for rotation about the swing axis of the housings, rotary drive means journaled in one of the housings and engaged with the drive element to rotate the latter, rotary driven means journaled in the other of the housings and engaged with the drive element to be rotated by the latter, a flexible tubular sleeve interposed between the housings and surrounding the pivot means the ends of the sleeve being sealingly engaged with the housings, a hub rotatably mounted on the other of the housings, and means connecting the driven means to the hub to turn the latter.

2. A drive comprising a pair of housings each formed with a gear recess, pivot means connecting the housings for relative swinging, rotary drive means journaled in one of the housings and including a gear in the recess of said one housing, rotary driven means journaled in the other housing and including a gear in the recess of said other housing, intermediate gears connecting said drive and driven gears, and sealing means surrounding the pivot means and engaging the housings about the recesses to seal the latter against dirt.

3. A drive comprising a pair of housings each formed with a gear recess, pivot means connecting the housings for relative swinging, rotary drive means journaled in one of the housings and including a gear in the recess of said one housing, rotary driven means journaled in the other housing and including a gear in the recess of said other housing, a pair of intermediate idler gears in constant mesh with each of said other gears carried by the pivot means for rotation about the swing axis of the housings, and sealing means surrounding the pivot means and engaging the housings about the recesses to seal the latter against dirt.

4. In a drive for a dirigible vehicle wheel, a pair of housings each having a pair of vertically spaced brackets extending toward the other housing of the pair and overlapping the brackets of such other housing pivot means extending through the brackets of both housings, an intermediate drive element coaxial to the pivot means, a drive shaft journaled in one housing, a drive element on said shaft engaged with the intermediate element to actuate the latter, a driven shaft journaled in the other housing, a driven element on said driven shaft engaged with intermediate element to be actuated thereby, a flexible casing surrounding the brackets, pivot means and intermediate driven element, said casing being sealingly connected to each of the housings, and a wheel hub having a driving connection with the driven shaft to be actuated by the latter.

5. In a drive for a dirigible vehicle wheel, a pair of housings each having a pair of vertically spaced brackets extending toward the other housing of the pair and overlapping the brackets of such other housing pivot means extending through the brackets of both housings, an intermediate drive element coaxial to the pivot means, a drive shaft journaled in one housing a drive element on said shaft engaged with the intermediate element to actuate the latter, a driven shaft journaled in the other housing a driven element on said driven shaft engaged with the intermediate element to be actuated thereby, an annular seat on each of the housings, a flexible annular casing surrounding the brackets, the pivot means and the intermediate drive element, the casing having opposite ends received on the housing seats in sealing relation, and a wheel hub having a driving connection with the driven shaft to be actuated by the latter.

6. In a drive for a dirigible vehicle wheel, a pair of housings each having a pair of vertically spaced brackets extending toward the other housing of the pair and overlapping the brackets of such other housing pivot means extending through the brackets of both housings, an intermediate drive element coaxial to the pivot means, a drive shaft journaled in one housing a drive element on said shaft engaged with the intermediate element to actuate the latter, a driven shaft journaled in the other housing a driven element on said driven shaft engaged with the intermediate element to be actuated thereby, an annular seat on each of the housings, each of said seats being substantially symmetric to the shaft journaled in the corresponding housing, a flexible annular casing surrounding the brackets, the pivot means and the intermediate drive element, the casing having opposite ends received on the housing seats in sealing relation, and a wheel hub having a driving connection with the driven shaft to be actuated by the latter.

7. In a drive for a dirigible vehicle wheel, a pair of housings each having a pair of vertically spaced brackets extending toward the other housing of the pair and overlapping the brackets of such other housing pivot means extending through the brackets of both housings, an intermediate drive element coaxial to the pivot means, a drive shaft journaled in one housing, a drive element on said shaft engaged with the intermediate element to actuate the latter, a driven shaft journaled in the other housing, a driven element on said driven shaft engaged with the intermediate element to be actuated thereby, an annular seat on each of the housings, the seat on the said one housing having a larger periphery than the seat on the said other housing, said seats being arranged for the movement of one seat within the other upon relative pivoting of the housings, a flexible annular casing surrounding the brackets, the pivot means and the intermediate drive element, the casing having opposite ends received on the housing seats in sealing relation, and a wheel hub having a driving connection with the driven shaft to be actuated by the latter.

References Cited in the file of this patent

UNITED STATES PATENTS

| | | |
|---|---|---|
| 1,116,102 | Nesmith | Nov. 3, 1914 |
| 1,238,067 | Nogrady | Aug. 21, 1917 |
| 2,066,805 | Skeen | Jan. 5, 1937 |
| 2,172,177 | Rose | Sept. 5, 1939 |
| 2,346,143 | Asam | Apr. 11, 1944 |